United States Patent
Gao et al.

(10) Patent No.: US 12,520,231 B2
(45) Date of Patent: Jan. 6, 2026

(54) METHOD FOR TRANSMITTING SYSTEM INFORMATION BLOCK, APPARATUS, AND STORAGE MEDIUM

(71) Applicant: HUAWEI TECHNOLOGIES CO., LTD., Guangdong (CN)

(72) Inventors: Kuandong Gao, Chengdu (CN); Huang Huang, Chengdu (CN); Mao Yan, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 421 days.

(21) Appl. No.: 17/865,789

(22) Filed: Jul. 15, 2022

(65) Prior Publication Data

US 2022/0353793 A1    Nov. 3, 2022

Related U.S. Application Data

(63) Continuation of application No. PCT/CN2020/072499, filed on Jan. 16, 2020.

(51) Int. Cl.
*H04W 48/12* (2009.01)

(52) U.S. Cl.
CPC .................. *H04W 48/12* (2013.01)

(58) Field of Classification Search
CPC ..... H04W 48/08; H04W 48/10; H04W 48/12; H04W 48/14; H04W 48/16; H04W 72/20; H04W 72/23; H04W 72/232; H04W 72/30; H04L 5/0048; H04L 5/0053
See application file for complete search history.

(56) References Cited

U.S. PATENT DOCUMENTS

| 2019/0394691 A1* | 12/2019 | Shih | H04W 48/20 |
| 2021/0274562 A1* | 9/2021 | Takeda | H04W 74/0833 |
| 2022/0104157 A1* | 3/2022 | He | H04W 56/001 |

(Continued)

FOREIGN PATENT DOCUMENTS

| CN | 101217689 A | 7/2008 |
| CN | 102651890 A | 8/2012 |
| CN | 103702394 A | 4/2014 |

(Continued)

OTHER PUBLICATIONS

Huawei et al., "Correction to MIB, S1B1, and Modification Period Descriptions," 3GPP TSG RAN WG2 Meeting #AH-1807, R2-1810124, Montreal, Canada, Jul. 2-6, 2018, 2 pages.

(Continued)

*Primary Examiner* — Peter Chen
(74) *Attorney, Agent, or Firm* — Fish & Richardson P.C.

(57) ABSTRACT

Methods, apparatuses, and storage media for transmitting a system information block are described. In an example implementation, a network device sends indication information to a terminal device. The terminal device determines a period of periodic transmission of a system information block (SIB) based on the received indication information, and receives, based on the period, a SIB1 sent by the network device. Alternatively, the terminal device determines a transmission location of aperiodic transmission of a system transport block based on the indication information, and receives, at the indicated transmission location, a SIB1 sent by the network device.

20 Claims, 7 Drawing Sheets

(56) References Cited

U.S. PATENT DOCUMENTS

2022/0247531 A1* 8/2022 Kim .................... H04L 1/08
2022/0279553 A1* 9/2022 Mu .................... H04W 48/12

FOREIGN PATENT DOCUMENTS

CN 108683474 A 10/2018
EP 3474554 A1 4/2019

OTHER PUBLICATIONS

3GPP TS 38.211 V16.0.0, "3rd Generation Partnership Project; Technical Specification Group Radio Access Network; NR; Physical Channels And Modulation (Release 16)," Dec. 2019, 129 pages.
3GPP TS 38.212 V16.0.0, "3rd Generation Partnership Project; Technical Specification Group Radio Access Network; NR; Multiplexing and Channel Coding (Release 16)," Dec. 2019, 145 pages.
3GPP TS 38.214 V16.0.0, "3rd Generation Partnership Project; Technical Specification Group Radio Access Network; NR; Physical Layer Procedures for Data (Release 16)," Dec. 2019, 147 pages.
3GPP TS 38.300 V16.0.0, "3rd Generation Partnership Project; Technical Specification Group Radio Access Network; NR; NR and NG-RAN Overall Description; Stage 2 (Release 16)," Dec. 2019, 101 pages.
3GPP TS 38.331 V15.8.0, "3rd Generation Partnership Project; Technical Specification Group Radio Access Network; NR; Radio Resource Control (RRC) Protocol Specification (Release 15)," Dec. 2019, 532 pages.
Extended European Search Report in European Appln No. 20914400.5, dated Nov. 23, 2022, 14 pages.
3GPP TS 36.211 V12.4.0 (Dec. 2014), "3rd Generation Partnership Project; Technical Specification Group Radio Access Network; Evolved Universal Terrestrial Radio Access (E-UTRA); Physical channels and modulation (Release 12)," Dec. 2014, 124 pages.
3GPP TS 36.213 V13.0.0 (Dec. 2015), "3rd Generation Partnership Project; Technical Specification Group Radio Access Network; Evolved Universal Terrestrial Radio Access (E-UTRA); Physical layer procedures (Release 13)," Dec. 2015, 326 pages.
3GPP TS 38.213 V15.7.0 (Sep. 2019), "3rd Generation Partnership Project; Technical Specification Group Radio Access Network; NR; Physical layer procedures for control (Release 15)," Sep. 2019, 108 pages.
ETSI TS 136 212 V13.0.0 (Jan. 2016), "LTE; Evolved Universal Terrestrial Radio Access (E-UTRA); Multiplexing and channel coding (3GPP TS 36.212 version 13.0.0 Release 13)," Jan. 2016, 123 pages.
Lenovo et al., "Validity of MIB and SIB1," 3GPP TSG-RAN WG2 NR AH1807 Meeting, R2-1810243, Montreal, Canada, Jul. 2-6, 2018, 3 pages.
LG Electronics Inc., "TP for email discussion," 3GPP TSG-RAN WG2 #102 R2-1808439, Busan, Korea, May 21-25, 2018, 10 pages.
PCT International Search Report and Written Opinion issued in International Application No. PCT/CN2020/072499 on Oct. 22, 2020, 16 pages (with English translation).
Qualcomm Incorporated, "Outer erasure code use cases and evaluation assumptions," 3GPP TSG-RAN WG1 #85, R1-164703, Nanjing, China, May 23-27, 2016, 6 pages.

* cited by examiner

METHOD FOR TRANSMITTING SYSTEM INFORMATION BLOCK, APPARATUS, AND STORAGE MEDIUM

CROSS-REFERENCE TO RELATED APPLICATIONS

This application is a continuation of International Application No. PCT/CN2020/072499, filed on Jan. 16, 2020, the disclosure of which is hereby incorporated by reference in its entirety.

TECHNICAL FIELD

This application relates to the field of communication technologies, and in particular, to a method for transmitting a system information block, an apparatus, and a storage medium.

BACKGROUND

Development of mobile services poses increasingly high requirements on a data rate and efficiency of wireless communication. In a future wireless communication system, a beamforming technology is used to limit energy for transmitting signals to a specific beam direction, to improve signal transmission and reception efficiency. The beamforming technology can be used to effectively expand a wireless signal transmission range and reduce signal interference, so that higher communication efficiency and a larger network capacity can be achieved. In a communication network using the beamforming technology, a transmit beam and a receive beam first need to be matched to make gains between a transmit end and a receive end maximum. Otherwise, high communication efficiency cannot be achieved. To achieve full coverage, a base station end needs to perform beam sweeping. Beam sweeping brings many problems. For example, overheads of broadcast information transmission increase. One type of information with high overheads is system information block 1 (SIB1) information.

In a current new radio (NR) protocol, a period of a transmission time interval (TTI) of a SIB1 is 160 ms, which means that transmission content of the SIB1 remains unchanged within 160 ms. For a terminal device, a transmission period of the SIB1 is 20 ms by default in a mode 1, that is, the terminal device receives a SIB1 every 20 ms. To enhance network coverage, for example, the transmission period of the SIB1 is adjusted to 40 ms, but the terminal device still receives the SIB1 every 20 ms, causing high detection overheads of the terminal device.

SUMMARY

This application provides a method for transmitting a system information block, an apparatus, and a storage medium, to reduce detection overheads of a terminal device and improve reception performance of the terminal device.

A first aspect of this application provides a method for transmitting a system information block, including:
receiving indication information sent by a network device, where the indication information indicates a transmission period of periodic transmission of a SIB1, or indicates a transmission location of aperiodic transmission of the SIB1; and receiving, based on the indication information, the SIB1 sent by the network device.

In the foregoing solution, the terminal device receives the indication information sent by the network device. The indication information indicates the transmission period of the SIB1 or the transmission location of aperiodic transmission of the SIB1. The transmission period or the transmission location may be dynamically changed, that is, the transmission period or the transmission location of the SIB1 can be dynamically adjusted by the network device based on changes in network conditions. The terminal device may receive the SIB1 based on the indication information sent by the network device, to reduce detection overheads of the terminal device and improve reception performance of the terminal device.

In a possible implementation, the receiving indication information sent by a network device includes: receiving a first synchronization signal block (SSB) sent by the network device, where the first SSB includes the indication information; or receiving downlink control information (DCI) that is of the SIB1 and that is sent by the network device, where the DCI includes the indication information.

The first SSB may be a non-cell-defining SSB, and a pdcch-ConfigSIB1 field of the non-cell-defining SSB does not indicate configuration information of a physical downlink control channel (PDCCH) of the SIB1. In an example, the network device may indicate the transmission period of the SIB1 using all or some of the following fields in the first SSB:

dmrs-TypeA-Position, intraFreqReselection, cellBarred, subCarrierSpacingCommon.

Optionally, the first SSB may alternatively be a cell-defining SSB, and the network device may indicate the transmission period of the SIB1 using a pdcch-ConfigSIB1 field in the first SSB.

In a possible implementation, the receiving DCI sent by the network device includes: receiving a second SSB sent by the network device, where the second SSB indicates configuration information of a PDCCH of the SIB1; and receiving, on the PDCCH based on the configuration information, the DCI that is of the SIB1 and that is sent by the network device.

Optionally, the indication information in the DCI indicates a transmission period of the SIB1 associated with an index of the second SSB. The second SSB is a cell-defining SSB, and a pdcch-ConfigSIB1 field of the cell-defining SSB indicates the configuration information of the PDCCH of the SIB1.

For example, the network device may send a series of second SSBs such as an SSB1, an SSB2, and an SSB3 in different beam directions, and may determine an SSB and a beam direction thereof based on an index of the SSB. It should be understood that the SSB1, the SSB2, and the SSB3 are all cell-defining SSBs, and a pdcch-ConfigSIB1 field of each SSB indicates configuration information of a PDCCH of a SIB1 associated with each SSB. It is assumed that the terminal device receives a second SSB, for example, the SSB1, in a beam direction, the terminal device obtains, from the pdcch-ConfigSIB1 field of the SSB1, configuration information of a PDCCH of a SIB1 associated with the SSB1. The terminal device receives, on the PDCCH of the SIB1 associated with the SSB1 and based on the configuration information, DCI that is of the SIB1 and that is sent by the network device. The DCI includes indication information that indicates a transmission period of the SIB1. The terminal device receives, based on the indication information, the SIB1 sent by the network device. Certainly, the terminal device may simultaneously receive second SSBs such as the SSB1 and the SSB2 in a plurality of beam directions. A processing process of the second SSBs in a plurality of beam directions is similar to the processing process of the second SSB in the foregoing single beam direction. Details are not described herein again.

Optionally, there is a quasi co-location (QCL) relationship between the second SSB and the PDCCH. There is a QCL relationship between two signals means that at least one of the following parameters is the same or there is a determined correspondence: an angle of arrival (AoA), a dominant AoA, an average AoA, a power angular spectrum of an AoA (PAS of AoA), an angle of departure (AoD), a dominant AoD, an average AoD, a PAS of an AoD, terminal transmit beamforming, terminal receive beamforming, spatial channel correlation, base station transmit beamforming, base station receive beamforming, an average channel gain, an average channel delay, delay spread. Doppler spread, Doppler frequency shift, and the like.

In a possible implementation, the receiving, based on the indication information, the SIB1 sent by the network device includes: determining the transmission period or the transmission location of the SIB1 based on the indication information: and receiving, on a physical downlink shared channel (PDSCH) of the SIB1 based on the transmission period or the transmission location of the SIB1, the SIB1 sent by the network device.

In the foregoing several implementations, the terminal device may obtain the transmission period of the SIB1 by receiving the DCI or the SSB sent by the network device, and receive, based on the transmission period of the SIB1 indicated in the DCI or the SSB, the SIB1 sent by the network device, to reduce overheads of blind detection of the terminal device and improve reception performance of the terminal device. In addition, the network device sends the SIB1 based on the transmission period, to reduce transmission overheads on the network side. It should be noted that the transmission period of the SIB1 indicated in the DCI may be separately indicated based on the SSB. There is a QCL relationship between the DCI and the SSB, and only a period of the SIB1 associated with an index of the SSB is the transmission period of the SIB1 indicated by the DCI.

A second aspect of this application provides a method for transmitting a system information block, including:
  generating indication information, where the indication information indicates a transmission period of periodic transmission of a SIB1, or indicates a transmission location of aperiodic transmission of the SIB1; and
  sending the indication information to a terminal device.

In a possible implementation, the sending the indication information to a terminal device includes: sending a first SSB to the terminal device, where the first SSB includes the indication information; or sending DCI of the SIB1 to the terminal device, where the DCI includes the indication information.

In a possible implementation, the sending DCI to the terminal device includes: sending a second SSB to the terminal device, where the second SSB indicates configuration information of a PDCCH of the SIB1; and sending, on the PDCCH based on the configuration information, the DCI of the SIB1 to the terminal device.

Optionally, the indication information in the DCI indicates a transmission period of the SIB1 associated with an index of the second SSB.

Optionally, there is a QCL relationship between the second SSB and the PDCCH.

In the foregoing several implementations, to enhance network coverage, the network device may need to adjust the transmission period or a transmission mode of the SIB1 in one or more beam directions. The network device may send the indication information to the terminal device by using the DCI or an SSB, so that the terminal device determines the transmission period of the SIB1 in the one or more beam directions based on the DCI or the SSB, and receives the SIB1 based on the transmission period. This reduces overheads of blind detection of the terminal device and improves reception performance of the terminal device while enhancing network coverage and reducing transmission overheads.

A third aspect of this application provides a terminal device, including:
  a transceiver module, configured to receive indication information sent by a network device, where the indication information indicates a transmission period of periodic transmission of a SIB1, or indicates a transmission location of aperiodic transmission of the SIB1, where the transceiver module is further configured to receive, based on the indication information, the SIB1 sent by the network device.

Optionally, the transceiver module is specifically configured to receive a first SSB sent by the network device, where the first SSB includes the indication information; or receive DCI that is of the SIB1 and that is sent by the network device, where the DCI includes the indication information.

Optionally, the transceiver module is specifically configured to receive a second SSB sent by the network device, where the second SSB indicates configuration information of a PDCCH of the SIB1; and receive, on the PDCCH based on the configuration information, the DCI that is of the SIB1 and that is sent by the network device.

Optionally, the indication information in the DCI indicates a transmission period of the SIB1 associated with an index of the second SSB.

Optionally, there is a QCL relationship between the second SSB and the PDCCH.

Optionally, the terminal device further includes a processing module. The processing module is configured to determine the transmission period of the SIB1 or the transmission location of the SIB1 based on the indication information. The transceiver module is configured to receive, on a physical downlink shared channel PDSCH of the SIB1 based on the transmission period or the transmission location of the SIB1, the SIB1 sent by the network device.

A fourth aspect of this application provides a network device, including:
  a processing module, configured to generate indication information, where the indication information indicates a transmission period of periodic transmission of a SIB1, or indicates a transmission location of aperiodic transmission of the SIB1; and a transceiver module, configured to send the indication information to a terminal device.

Optionally, the transceiver module is specifically configured to send a first SSB to the terminal device, where the first SSB includes the indication information; or send DCI of the SIB1 to the terminal device, where the DCI includes the indication information.

Optionally, the transceiver module is specifically configured to send a second SSB to the terminal device, where the second SSB indicates configuration information of a physical downlink control channel PDCCH of the SIB1; and send, on the PDCCH based on the configuration information, the DCI to the terminal device.

Optionally, the indication information in the DCI indicates a transmission period of the SIB1 associated with an index of the second SSB.

Optionally, there is a QCL relationship between the second SSB and the PDCCH.

A fifth aspect of this application provides a communication apparatus, including a processor. The processor is coupled to a storage medium, and when the processor executes instructions in the storage medium, the communication apparatus is enabled to perform the method according to any implementation of the first aspect of this application.

A sixth aspect of this application provides a communication apparatus, including a processor. The processor is coupled to a storage medium, and when the processor executes instructions in the storage medium, the communication apparatus is enabled to perform the method according to any implementation of the second aspect of this application.

A seventh aspect of this application provides a computer storage medium, configured to store a computer program. When the computer program is run on a computer, the computer is enabled to perform the method according to any implementation of the first aspect of this application.

An eighth aspect of this application provides a computer storage medium, configured to store a computer program. When the computer program is run on a computer, the computer is enabled to perform the method according to any implementation of the second aspect of this application.

A ninth aspect of this application provides a computer program product. When the computer program product runs on a computer, the computer is enabled to perform the method according to any implementation of the first aspect of this application.

A tenth aspect of this application provides a computer program product. When the computer program product runs on a computer, the computer is enabled to perform the method according to any implementation of the second aspect of this application.

An eleventh aspect of this application provides a chip, including a processor and an interface. The chip is configured to invoke, from a memory, a computer program stored in the memory, and run the computer program, to perform the method according to any implementation of the first aspect of this application.

A twelfth aspect of this application provides a chip, including a processor and an interface. The chip is configured to invoke, from a memory, a computer program stored in the memory, and run the computer program, to perform the method according to any implementation of the second aspect of this application.

This application provides a method for transmitting a system information block, an apparatus, and a storage medium. The network device sends indication information to a terminal device. The terminal device determines a period of periodic transmission of a system information block based on the received indication information, and receives, based on the period, a SIB1 sent by the network device. Alternatively, the terminal device determines a transmission location of aperiodic transmission of a system information block based on the indication information, and receives, at the indicated transmission location, a SIB1 sent by the network device. In the foregoing execution process, overheads of blind detection on the SIB1 by the terminal device can be reduced, and reception performance of the terminal device can be improved. In addition, the network device sends the SIB1 based on the period or the transmission location, so that transmission overheads on the network side can be reduced.

DESCRIPTION OF EMBODIMENTS

Figure 1:
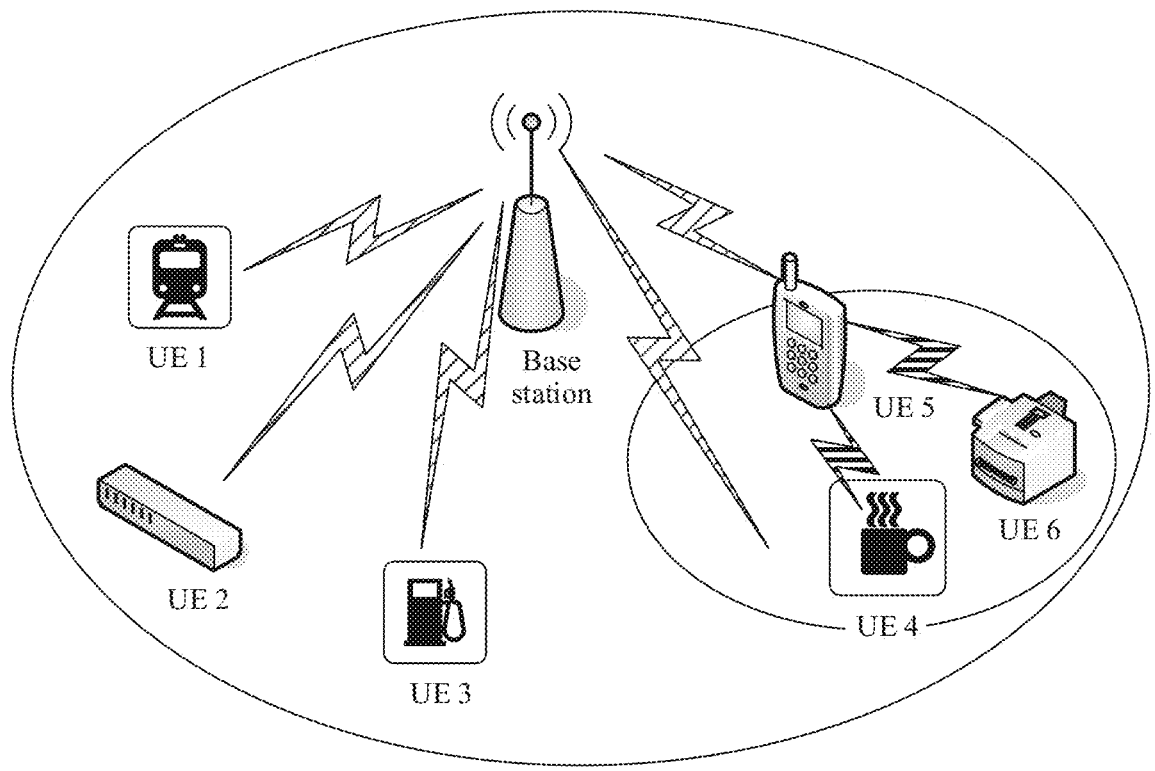
FIG. 1 is a schematic diagram of a system architecture according to this application.

Currently, in the existing NR protocol, a transmission period of a SIB1 is not specifically defined for a network device. To enhance network coverage, the network device may need to adjust a transmission period or a transmission mode of a SIB1 in one or more beam directions. If a terminal device still receives the SIB1 at an interval of 20 ms by default, detection overheads of the terminal device may be excessively high, or reception performance of the terminal device may deteriorate.

Based on the existing problems, this application provides a method for transmitting a system information block. The method is mainly applied to various communication systems such as a 5th generation mobile network (5G) communication system and an NR communication system that use a beamforming technology. The method may alternatively be applied to another communication system, provided that another entity needs to interpret a data transmission format in a specific manner when an entity in the communication system needs to be indicated to communicate with the another entity. For example, the method may be applied to scheduling of a plurality of data blocks between a network device and a terminal device, or may be applied to two terminal devices, where one of the terminal devices undertakes a function of an access network. Specifically, the communication system may be, for example, a global system for mobile communications (GSM) system, a code-division multiple access (CDMA) system, a wideband code division multiple access (WCDMA) system, a General Packet Radio Service (GPRS) system, a Long Term Evolution (LTE) system, a Long Term Evolution Advanced LTE-A(LTE Advanced) system, an LTE frequency division duplex (FDD) system, an LTE time division duplex (TDD) system, or a universal Mobile Telecommunications System (UMTS).

The terminal device in the technical solutions in embodiments of this application may be a wireless terminal, or may be a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device. This is not limited herein.

The network device in embodiments of this application is a device deployed in a radio access network to provide a wireless communication function, and may be a base station (BTS) in global system for mobile Communications (GSM) or code-division multiple access (CDMA), or may be a base station (NB) in wideband code division multiple access (WCDMA), or may be an evolved base station (eNB or eNodeB) in LTE, a relay station or an access point, a transmission and reception point (TRP) in an NR network, a next generation node B (gNB), a base station in another future network system, or the like. This is not limited herein.

In the NR network in embodiments of this application, a synchronization signal (SS) and a physical broadcast channel (PBCH) block appear in a form of an SS/PBCH resource block based on a specific time-frequency domain resource relationship, which are briefly referred to as an SSB. The SSB may include at least one of a PBCH, a primary synchronization signal (PSS), and a secondary synchronization signal (SSS). After receiving the SSB, the terminal device may implement time synchronization with the network device, and obtain basic configuration information of a network. In addition, the terminal device further needs to obtain some necessary system information to complete camping on a cell and initial access. The necessary system information is referred to as remaining minimum system information (RMSI) in an NR. In a current R15 protocol, the RMSI may be considered as a SIB1 message in LTE, and is mainly sent through a PDSCH. The PDSCH channel needs to be scheduled based on DCI of a PDCCH. The terminal device needs to obtain, from a pdcch-ConfigSIB1 field of a master information block (MIB), PDCCH channel information for scheduling the RMSI, and the terminal device performs blind detection on the PDCCH to obtain the RMSI, namely, the SIB1 message.

The SSB in embodiments of this application may be a cell-defining SSB, or may be a non-cell-defining SSB. The terminal device may determine, based on an indication of a value of an ssb-SubcarrierOffset field that is in the MIB and that is for determining an offset between an SSB subcarrier and a data subcarrier, whether the SSB is a cell-defining SSB or a non-cell-defining SSB. If a pdcch-ConfigSIB1 field in the SSB indicates configuration information of a PDCCH of a SIB1, the SSB is a cell-defining SSB; otherwise, the SSB is a non-cell-defining SSB. There are a series of cell-defining SSBs (which may be referred to as an SSB set) on a wideband of a cell. Each SSB corresponds to one beam direction and carries same information. All SSBs in one SSB set need to be in a same half-frame. The network device broadcasts the SSB, for camping of the terminal device.

SIB1 information in embodiments of this application may include one or more of the following information: configuration information of a random access channel, configuration information of paging, configuration information of a downlink shared channel, configuration information of an uplink shared channel, a public land mobile network (PLMN)-Identity List, a tracking area code, cell barring access information, other system information (OSI) or scheduling information of a SIB, system information (SI) valid value (SI Value Tag), bandwidth indication information, cell reselection information, and the like.

There are three multiplexing modes for the PDCCH of the SIB1 or a control resource set (CORESET) and an SSB: time division multiplexing; frequency division multiplexing, where a PDSCH of the SIB1 and the SSB are frequency division multiplexed, and the PDCCH of the SIB1 and the SSB have a same slot; and frequency division multiplexing, where the PDSCH and the PDCCH that are of the SIB1 and the SSB are frequency division multiplexed.

QCL in embodiments of this application means that at least one of the following parameters is the same or there is a determined correspondence: an AoA, a dominant AoA, an average AoA, a PAS of an AoA, an AoD, a dominant AoD, an average AoD, a PAS of an AoD, terminal transmit beamforming, terminal receive beamforming, spatial channel correlation, base station transmit beamforming, base station receive beamforming, an average channel gain, an average channel delay, delay spread, Doppler spread, Doppler frequency shift, and the like.

That there is a QCL relationship between the SSB and the PDCCH in embodiments of this application may indicate that the SSB and the PDCCH have a same beam, or have a same or all of the foregoing parameters. That there is a QCL relationship between the SSB and the PDCCH may also mean that there is an association relationship between the SSB and the PDCCH. Association may also be referred to as mapping, correspondence, correlation, or allocation. The association relationship may be configured by the network device, or may be standard-specified, or may be pre-agreed on between the network device and the terminal device.

FIG. 1 is a schematic diagram of a system architecture according to this application. As shown in FIG. 1, a specific system architecture is provided. The system includes a network device, which may be a base station (BS), and a plurality of terminal devices such as UE 1 to UE 6 shown in FIG. 1 that communicate with the base station. The base station may be a multi-beam base station, or may be a single-beam base station. The terminal device may be a fixed terminal device, or may be a mobile terminal device. The base station and the UE 1 to the UE 6 form a communication system. In the communication system, the base station may send indication information to one or more of the UE 1 to the UE 6, so that the one or more of the UE 1 to the UE 6 receive a SIB1 based on the indication information.

The following describes the technical solutions of this application in detail with reference to the accompanying drawings by using several specific embodiments. The following specific embodiments may be mutually combined, and same or similar concepts or processes may not be repeatedly described in some embodiments.

Figure 2:
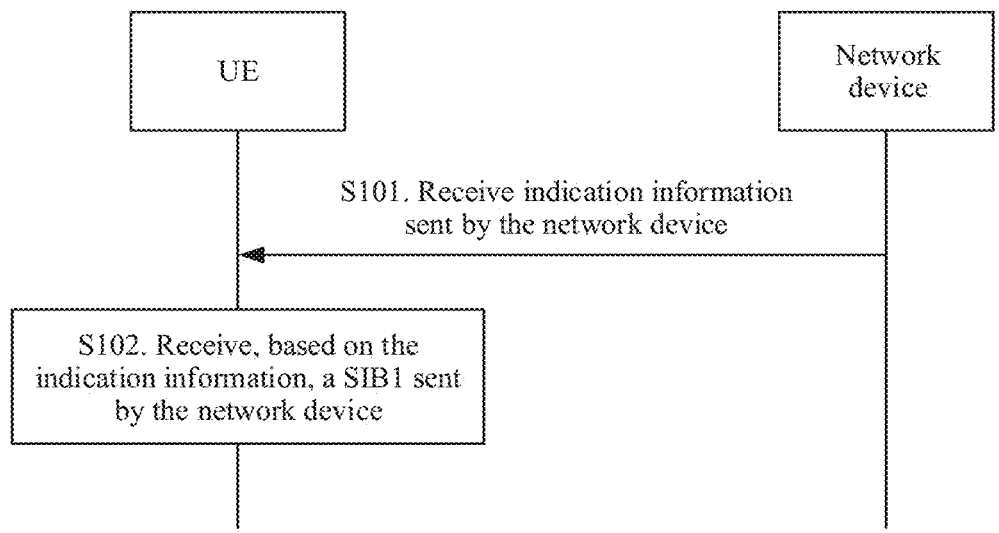
FIG. 2 is a flowchart of Embodiment 1 of a method for transmitting a system information block according to this application.

FIG. 2 is a flowchart of Embodiment 1 of a method for transmitting a system information block according to this application. As shown in FIG. 2, in the foregoing system architecture, the method for transmitting a system information block specifically includes the following steps.

S101. Receive indication information sent by a network device.

In this solution. UE receives the indication information sent by the network device, where the indication information indicates a period of a SIB1 whose transmission mode is periodic transmission, or indicates a transmission location of the SIB1 whose transmission mode is aperiodic transmission. In a current protocol, for the UE in a mode 1, that is, in a mode in which a PDCCH of the SIB1 or a CORESET and an SSB are time division multiplexed, the transmission period of the SIB1 is 20 ms by default for the UE, and the UE receives the SIB1 based on the transmission period. For the network device, the transmission period of the SIB1 is not defined. However, a channel may change accordingly as a network condition changes. Therefore, to enhance network coverage, a method for reconfiguring transmission of a SIB1 is provided in this solution. The network device may reconfigure a transmission period of a SIB1 in one or more beam directions based on the channel and the network condition.

In this step, the UE receives the indication information transmitted by the SIB1 sent by the network device side. The indication information may be used to reconfigure the transmission period or the transmission location (that is, a time domain transmission location) of aperiodic transmission of the SIB1. That is, the network device sends an updated transmission period or updated transmission location of aperiodic transmission of the SIB1 to the UE based on the indication information, so that the UE learns of an updated transmission status of the SIB1.

The indication information may indicate the transmission period of the SIB1, and the transmission period may be any one of [5, 10, 20, 40, 80, 160] ms.

In a specific implementation, the network device may deliver the indication information to the UE via DCI of the SIB1.

For example, the network device may indicate the transmission mode of the SIB1 by using 3 bits in a DCI field. For example, 000 indicates that the transmission period of the SIB1 is 5 ms. 001 indicates that the transmission period of the SIB1 is 10 ins. 010 indicates that the transmission period of the SIB1 is 20 ms, 011 indicates that the transmission period of the SIB1 is 40 ms, 100 indicates that the transmission period of the SIB1 is 60 ms, 101 indicates that the transmission period of the SIB1 is 80 ns, 110 indicates that the transmission period of the SIB1 is 160 ms, and 111 indicates that the transmission mode of the SIB1 is aperiodic transmission. A modulation mode of the SIB1 is quadrature phase shift keying (QPSK). The network device may indicate the modulation mode of the SIB1 by using a modulation and coding scheme (MCS) field in DCI. The network device may also indicate the transmission period or a quantity of repetitions of the SIB1 by using 1 bit of the MCS field in the DCI. For example, 1 indicates that the transmission period of the SIB1 is less than 20 ms, and the quantity of repetitions of the SIB1 is greater than 8.0 indicates that the transmission period of the SIB1 is greater than 20 ms, and the quantity of repetitions of the SIB1 is less than 8.

In an example, the transmission period of the SIB1 indicated in the DCI may be separately indicated based on the SSB. It should be understood that, in a new radio (NR) network, the network device may send a series of SSBs such as an SSB1, an SSB2, and an SSB3 in different beam directions. The SSBs in the different beam directions may indicate same or different transmission periods of the SIB1. For example, a transmission period of the SIB1 indicated by the SSB1 is 10 ms, a transmission period of the SIB1 indicated by the SSB2 is 20 ms, and a transmission period of the SIB1 indicated by the SSB3 is 10 ms. When the UE receives a transmission period of a SIB1 indicated by an SSB, the UE receives, based on the transmission period of the SIB1 indicated by the SSB, the SIB1 in a beam direction corresponding to the SSB. The UE receives the transmission period of the SIB1 indicated by the DCI, and may determine that a transmission period of the SIB1 associated with an index of the SSB (for example, the SSB1) is the transmission period of the SIB1 indicated by the DCI. The association means that there is a QCL relationship between the DCI and the SSB (or there is a QCL relationship between the PDCCH and the SSB). To be specific, for the terminal device, it is assumed that the period of the SIB1 that has the QCL relationship only with this SSB is used as an indicated value that indicates the PDCCH of the SIB1, but that a period of a SIB1 of another SSB is used as the indicated value is not assumed. The SIB1 of the another SSB represents a SIB1 that has a QCL relationship with the another SSB. An advantage of distinguishing the SSBs is that the SSBs in different beam directions indicate different transmission periods of the SIB1, so that overheads of blind detection performed by the UE can be reduced while network coverage is enhanced and transmission overheads on the network side are reduced.

Optionally, the transmission periods of the SIB1 indicated in the DCI may be periods of PDCCHs and/or PDSCHs of a SIB1 associated with all SSBs transmitted in one period in which an SSB is transmitted. All the SSBs are SSBs in the beam directions, and the periods of the SIB1 associated with all the SSBs may be same periods.

In some embodiments, the network device may further indicate the transmission period of the SIB1 using any one of the following fields in the PDCCH; a frequency domain resource assignment field for assignment of a PDSCH frequency domain resource, a time domain resource assignment field for assignment of a PDSCH time domain resource, a modulation and coding scheme field that indicates modulation and decoding, a VRB-to-PRB mapping field that indicates mapping from a virtual resource block to a physical resource block, a redundancy version field that indicates a redundancy version, and a system information indicator field that indicates a system information type.

In a specific implementation, the network device may deliver the indication information to the UE using an SSB. Specifically, the network device may indicate the transmission period of the SIB1 using a field of a non-cell-defining SSB or a field of a cell-defining SSB.

It should be noted that the UE may determine, based on a value of an ssb-SubcarrierOffset field in a MIB, whether the SSB is a cell-defining SSB or a non-cell-defining SSB. A pdcch-ConfigSIB1 field in the cell-defining SSB indicates configuration information of the PDCCH of the SIB1, and a pdcch-ConfigSIB1 field in the non-cell-defining SSB does not indicate the configuration information of the PDCCH of the SIB1.

In this embodiment, the network device may indicate the transmission period of the SIB1 using the cell-defining SSB. The transmission period of the SIB1 is a transmission period corresponding to a beam direction, that is, the transmission period of the SIB1 associated with the SSB. It should be understood that, in an NR network, the network device may send a series of SSBs such as an SSB1, an SSB2, and an SSB3 in different beam directions. The SSBs in the different beam directions may indicate same or different transmission periods of the SIB1. For example, a transmission period of the SIB1 indicated by the SSB1 is 10 ms, a transmission period of the SIB1 indicated by the SSB2 is 20 ms, and a transmission period of the SIB1 indicated by the SSB3 is 10 ms. When the UE receives a transmission period of a SIB1 indicated by an SSB, the UE receives, based on the transmission period of the SIB1 indicated by the SSB, the SIB1 in a beam direction corresponding to the SSB. An advantage of distinguishing the SSBs is that the SSBs in different beam directions indicate different transmission periods of the SIB1, so that overheads of blind detection performed by the UE can be reduced while network coverage is enhanced and transmission overheads on the network side are reduced.

In the NR network, the SSB carries information on a PBCH, and the PBCH is used to carry the MIB. The MIB includes the following fields: a dmrs-TypeA-Position field for determining a position of a demodulation reference signal, a systemFrameNumber field for determining a frame number, a subCarrierSpacingCommon field for determining a data subcarrier spacing, a cellBarred field for determining whether a cell can be accessed, an intraFreqReselection field for performing intra-frequency cell reselection, an ssb-SubcarrierOffset field for determining an offset between an SSB subcarrier and a data subcarrier, and a pdcch-ConfigSIB1 field for determining configuration information of a PDCCH of a SIB1.

In some embodiments, the network device may further indicate the transmission period of the SIB1 using a field of a non-cell-defining SSB. For example, all or some fields of dmrs-TypeA-Position, intraFreqReselection, cellBarred, and subCarrierSpacingCommon indicate the transmission period of the SIB1. For example, 1 bit of a dmrs-TypeA-Position field, 1 bit of an intraFreqReselection field, and 1 bit of a cellBarred field jointly indicate the transmission period of the SIB1, as described in the foregoing embodiment.

The indication information may further indicate the transmission location of aperiodic transmission of the SIB1. Specifically, the network device may deliver, to the UE using the DCI, the indication information that indicates the transmission location of the SIB1. The DCI may indicate the transmission location of the SIB1 in the following several implementations.

In a specific implementation, the network device indicates, by using each data bit in the DCI, whether to send the SIB1 in a frame for transmitting a SIB1. For example, 0 indicates that no SIB1 is sent in the transmission frame, and 1 indicates that the SIB1 is sent in the transmission frame.

In a specific implementation, the network device may further perform group indication by grouping transmission frames. For example, four transmission frames are used as a group, and each transmission frame corresponds to 10 ns. Therefore, the transmission frames corresponding to 160 ms may be divided into four groups. The network device may indicate a transmission status of the SIB1 in the four groups of transmission frames using data bits in the DCI.

Figure 3A:
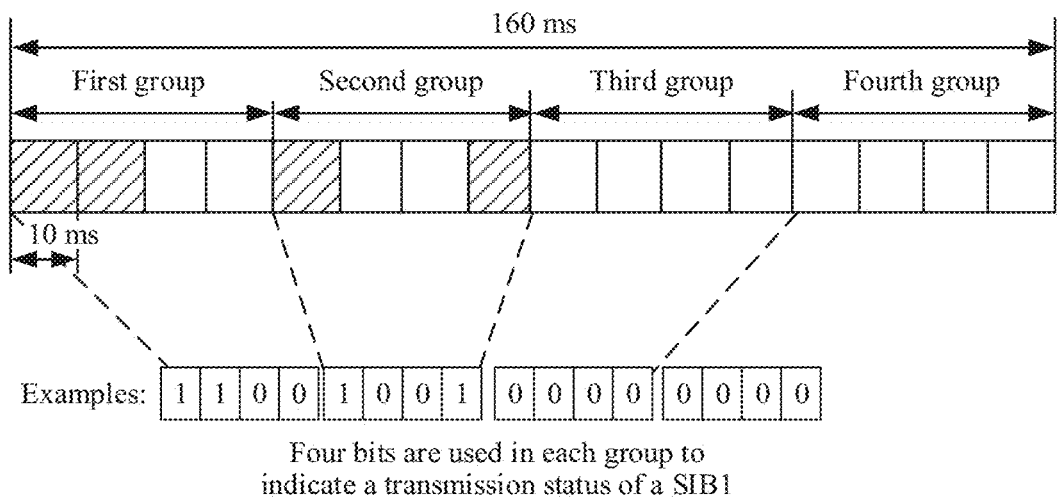
FIG. 3a is a schematic diagram of configuring a transmission location of a SIB1 according to this application.

The network device may separately indicate the four groups of transmission frames, and a same quantity of data bits is used for each group. For example, four bits are used for each group for indication, and therefore 4*4 bits are required to indicate the four groups of transmission frames. For example, as shown in FIG. 3a, the first four bits are [1,1,0,0], which indicate that a SIB1 is sent in first and second transmission frames in a first group; the second four bits are [1,0,0,1], which indicate that a SIB1 is sent in first and fourth transmission frames in a second group; and manners of indicating a SIB1 in a third group and a fourth group are similar.

Figure 3B:
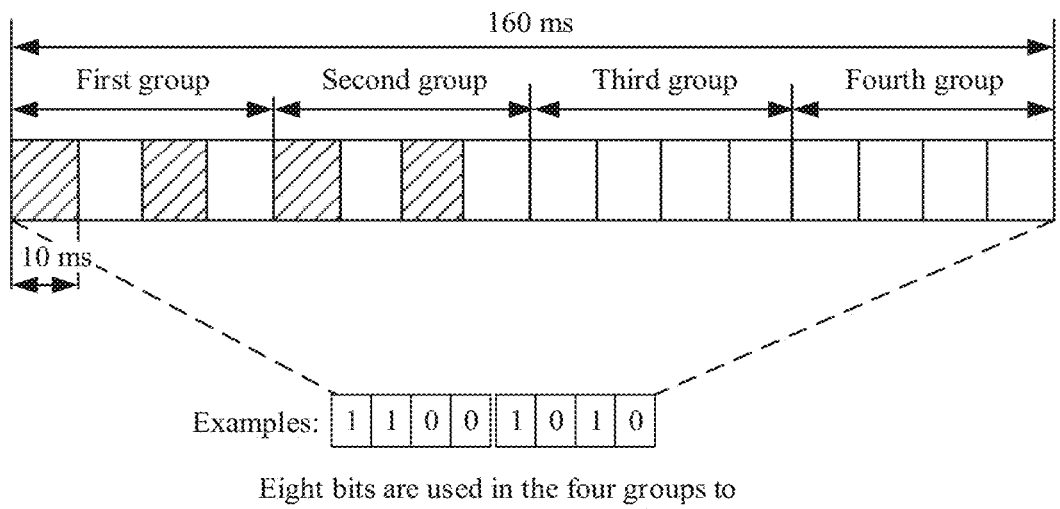
FIG. 3b is another schematic diagram of configuring a transmission location of a SIB1 according to this application.

The network device may further perform joint indication on the four groups of transmission frames. The first half of a field indicates whether a SIB1 is sent in each group of transmission frames, and the last half of the field indicates a transmission status of a SIB1 in a group in which the SIB1 is sent. For example, eight bits are used for joint indication. The first four bits indicate sending statuses of a SIB1 of four groups of transmission frames, that is, the SIB1 is sent and not sent in specific groups. The last four bits indicate sending statuses of transmission frames in a group in which the SIB1 is sent, that is, the SIB1 is sent in specific transmission frames in the group. For example, as shown in FIG. 3b, the first four bits are [1,1,0,0], which indicate that a SIB1 is sent in transmission frames in first and second groups. The last four bits are [1,0,1,0], which indicate that a SIB1 is sent in the first and third transmission frames in the first group, and a SIB1 is sent in the first and third transmission frames in the second group.

It should be noted that an indication granularity for group indication is not limited to a frame, and indication may also be performed at a granularity of a half frame or two frames. This is not limited in this embodiment. The foregoing quantity of groups is merely an example. The quantity M of groups may be set based on an actual requirement, and M may be any value in 1, 2, 3, 4, 5, 6, 7, 8, 9, 10, 11, 12, 13, 14, 15, and 16. The transmission location of the SIB1 may be indicated by K bits in each group, and K may be any value in 0, 1, 2, 3, and 4.

S102. Receive, based on the indication information, the SIB1 sent by the network device.

In this step, the UE may determine, based on the received indication information, the period of the SIB1 whose transmission mode is periodic transmission, or the transmission location of the SIB1 whose transmission mode is aperiodic transmission; and receive, based on the transmission period or the transmission location of the SIB1, the SIB1 sent by the network device. This reduces overheads of blind detection performed by the UE.

For example, the UE receives the indication information sent by the network device, where the indication information indicates that a transmission period of the SIB1 in one or more beam directions is 40 ms (the transmission period of the SIB1 is 20 ms by default for the UE). The UE learns, based on the indication information, that the transmission period of the SIB1 in the one or more beam directions changes, and the UE receives the SIB1 in the one or more beam directions based on a new transmission period. This process can reduce overheads of blind detection on the SIB1 by the UE in a beam direction.

For example, the UE receives the indication information sent by the network device, where the indication information indicates that the transmission period of the SIB1 in one or more beam directions is 10 ms (the transmission period of the SIB1 is 20 ms by default for the UE). The UE learns, based on the indication information, that the transmission period of the SIB1 in the one or more beam directions changes, and the UE receives the SIB1 in the one or more beam directions based on a new transmission period. This process can improve reception performance of the UE.

For example, the UE receives the indication information sent by the network device, where the indication information indicates a transmission location of aperiodic transmission of the SIB1 in one or more beam directions. The UE learns, based on the indication information, that the transmission location of the SIB1 in the one or more beam directions changes, and the UE receives the SIB1 sent in the one or more beam directions based on a new transmission location. This process can reduce overheads of blind detection on the SIB1 by the UE in a beam direction, and improve reception performance of the UE.

In conclusion, in the method for transmitting a system information block provided in this embodiment, the UE determines, based on the indication information sent by the network device, the period of periodic transmission of the system information block, and receives, based on the period, the SIB1 sent by the network device: or the UE determines, based on the indication information sent by the network device, the transmission location of aperiodic transmission of the system information block, and receives, at the transmission location, the SIB1 sent by the network device. This reduces detection overheads of the terminal device and improves reception performance of the terminal device. In addition, the network device sends the SIB1 based on the period or the transmission location. This can reduce transmission overheads on the network side.

The following describes the method for transmitting a system information block provided in this application in detail with reference to two specific embodiments based on the foregoing embodiment. In the following two embodiments, indication information is located in different information blocks, which can improve the processing efficiency of UE while enhancing network coverage.

Figure 4:
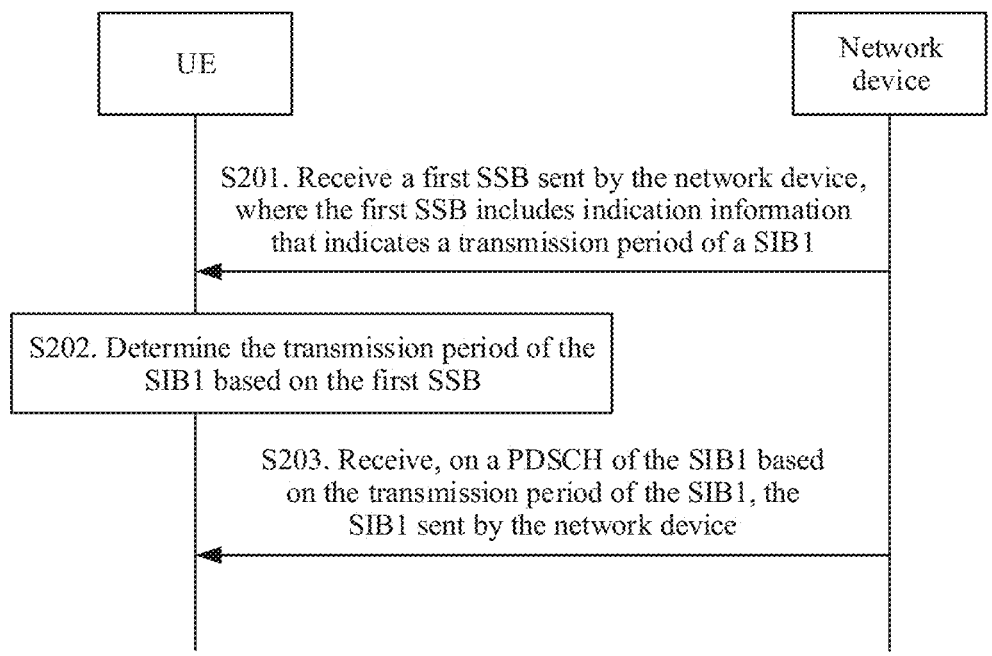
FIG. 4 is a flowchart of Embodiment 2 of a method for transmitting a system information block according to this application.

FIG. 4 is a flowchart of Embodiment 2 of a method for transmitting a system information block according to this application. As shown in FIG. 4, the method for transmitting a system information block specifically includes the following steps.

S201. Receive a first SSB sent by a network device, where the first SSB includes indication information that indicates a transmission period of a SIB1.

S202. Determine the transmission period of the SIB1 based on the first SSB.

S203. Receive, on a PDSCH of the SIB1 based on the transmission period of the SIB1, the SIB1 sent by the network device.

In this embodiment, the first SSB may be a cell-defining SSB, and the network device may indicate the transmission period of the SIB1 using all or some of the following fields in the first SSB:

dmrs-TypeA-Position, intraFreqReselection, cellBarred, subCarrierSpacingCommon.

Optionally, the first SSB may alternatively be a cell-defining SSB, and the network device may indicate the transmission period of the SIB1 using a pdcch-ConfigSIB1 field in the first SSB.

In an example, the first SSB may be an SSB in a same beam direction. After receiving the transmission period of the SIB1 indicated by the network device by using the first SSB, the UE determines the transmission period of the SIB1 based on a corresponding field in the first SSB, and receives, on the PDSCH of the SIB1 based on the transmission period of the SIB1, the SIB1 sent by the network device.

Optionally, the first SSBs may alternatively be SSBs in a plurality of beam directions. The UE receives, in a corresponding beam direction based on a transmission period of the SIB1 indicated by the SSBs in different beam directions, the SIB1 sent by the network device. The SSBs in the different beam directions may indicate same or different transmission periods of the SIB1.

In the foregoing process, the network device indicates the transmission period of the SIB1 by using the first SSB, and the UE directly receives a PDCCH and the PDSCH based on the transmission period of the SIB1 indicated in the first SSB. This improves reception performance of the terminal device for the SIB1.

Figure 5:
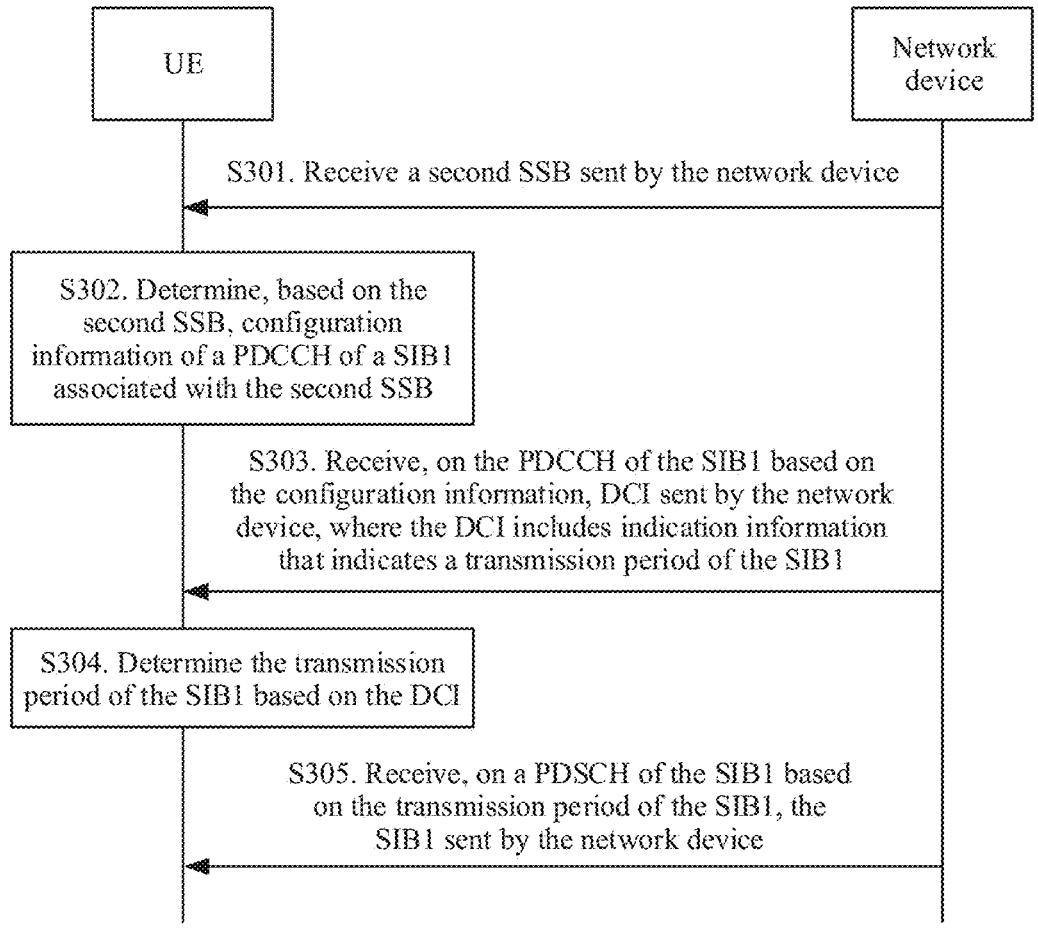
FIG. 5 is a flowchart of Embodiment 3 of a method for transmitting a system information block according to this application.

FIG. 5 is a flowchart of Embodiment 3 of a method for transmitting a system information block according to this application. As shown in FIG. 5, the method for transmitting a system information block specifically includes the following steps.

S301. Receive a second SSB sent by a network device. The second SSB indicates configuration information of a PDCCH of the SIB1.

S302. Determine, based on the second SSB, configuration information of a PDCCH of a SIB1 associated with the second SSB.

S303. Receive, on the PDCCH of the SIB1 based on the configuration information, DCI sent by the network device, where the DCI includes indication information that indicates a transmission period of the SIB1.

S304. Determine the transmission period of the SIB1 based on the DCI.

S305. Receive, on a PDSCH of the SIB1 based on the transmission period of the SIB1, the SIB1 sent by the network device.

In this embodiment, the second SSB is a cell-defining SSB, and includes a pdcch-ConfigSIB1 field, which indicates the configuration information of the PDCCH of the SIB1.

In an example, the second SSB may be an SSB in a beam direction. UE receives the second SSB sent by the network device in the beam direction, and determines, based on the second SSB, the PDCCH of the SIB1 associated with the second SSB. The network device delivers, to the UE by using the DCI of the SIB1, the indication information that indicates the transmission period of the SIB1. The UE receives the DCI on the PDCCH of the SIB1 associated with the second SSB, and determines the transmission period of the SIB1 based on a field in the DCI, so that the UE receives, on the PDSCH of the SIB1 based on the transmission period of the SIB1, the SIB1 sent by the network device.

Optionally, the second SSBs may alternatively be SSBs in a plurality of beam directions. The UE receives the second SSBs sent by the network device in the plurality of beam directions, determines the PDCCH of the SIB1 associated with the second SSB in each beam direction, separately receives DCI of the SIB1 on the PDCCHs in different beam directions, and receives, based on the transmission period of the SIB1 indicated in each piece of DCI, the SIB1 sent by the network device in the different beam directions.

In this embodiment, there is a QCL relationship between the second SSB and the PDCCH.

In the foregoing process, the network device indicates the transmission period of the SIB1 by using the PDCCH of the SIB1 (the DCI of the SIB1), and the UE receives the PDCCH and the PDSCH based on the transmission period of the SIB1 indicated in the PDCCH of the SIB1, to improve reception performance of the terminal device for the SIB1.

It may be understood that, in the foregoing method embodiments, the methods and the operations implemented by the terminal device may alternatively be implemented by a component (for example, a chip or a circuit) that can be used in the terminal device, and the methods and the operations implemented by the network device may alternatively be implemented by a component (for example, a chip or a circuit) that can be used in the network device.

The foregoing mainly describes the solutions provided in embodiments of this application from a perspective of interaction. It may be understood that, to implement the foregoing function, each network element, such as the terminal device or the network device, includes a corresponding hardware structure and/or software module for performing each function. A person skilled in the art may be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function modules of the terminal device or the network device may be divided based on the foregoing method examples. For example, function modules may be divided corresponding to functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation. An example in which various functional modules are divided according to corresponding functions is used below for description.

Figure 6:
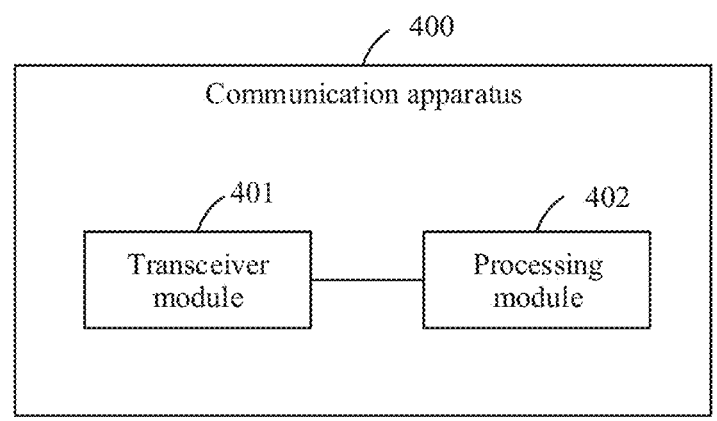
FIG. 6 is a schematic diagram of a structure of a communication apparatus according to this application.

FIG. 6 is a schematic diagram of a structure of a communication apparatus according to this application. As shown in FIG. 6, the communication apparatus 400 provided in this embodiment includes:

a transceiver module 401, configured to receive indication information sent by a network device, where the indication information indicates a transmission period of periodic transmission of a SIB1, or indicates a transmission location of aperiodic transmission of the SIB1, where the transceiver module 401 is further configured to receive, based on the indication information, the SIB1 sent by the network device.

In a possible implementation, the transceiver module 401 is specifically configured to:

receive a first SSB sent by the network device, where the first SSB includes the indication information; or receive downlink control information DCI that is of the SIB1 and that is sent by the network device, where the DCI includes the indication information.

In a possible implementation, the transceiver module 401 is specifically configured to:

receive a second SSB sent by the network device, where the second SSB indicates configuration information of a PDCCH of the SIB1; and receive, on the PDCCH based on the configuration information, the DCI of the SIB1 sent by the network device.

Optionally, the indication information in the DCI indicates a transmission period of the SIB1 associated with an index of the second SSB.

Optionally, there is a QCL relationship between the second SSB and the PDCCH.

In a possible implementation, a processing module 402 is specifically configured to:

determine the transmission period of the SIB1 or the transmission location of the SIB1 based on the indication information; and the transceiver module 401 is specifically configured to receive, on a physical downlink shared channel PDSCH of the SIB1 based on the transmission period or the transmission location of the SIB1, the SIB1 sent by the network device.

The communication apparatus provided in this embodiment is configured to perform the technical solutions on the terminal device side in the foregoing method embodiments. An implementation principle and technical effects of the communication apparatus are similar to those of the method embodiments, and details are not described herein again.

Figure 7:
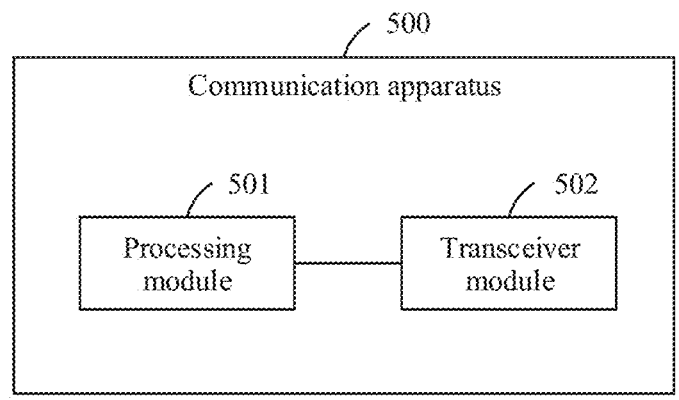
FIG. 7 is a schematic diagram of a structure of a communication apparatus according to this application.

FIG. 7 is a schematic diagram of a structure of a communication apparatus according to this application. As shown in FIG. 7, the communication apparatus 500 provided in this embodiment includes:

a processing module 501, configured to generate indication information, where the indication information indicates a transmission period of periodic transmission of a SIB1, or indicates a transmission location of aperiodic transmission of the SIB1; and a transceiver module 502, configured to send the indication information to a terminal device.

In a possible implementation, the transceiver module 502 is specifically configured to:

send a first SSB to the terminal device, where the first SSB includes the indication information; or send DCI of the SIB1 to the terminal device, where the DCI includes the indication information.

In a possible implementation, the transceiver module 502 is specifically configured to:

send a second SSB to the terminal device, where the second SSB indicates configuration information of a PDCCH of the SIB1; and send, on the PDCCH based on the configuration information, DCI of the SIB1 to the terminal device.

Optionally, the indication information in the DCI indicates a transmission period of the SIB1 associated with an index of the second SSB.

Optionally, there is a QCL relationship between the second SSB and the PDCCH.

The communication apparatus provided in this embodiment is configured to perform the technical solutions on the network device side in the foregoing method embodiments. An implementation principle and technical effects of the communication apparatus are similar to those of the method embodiments, and details are not described herein again.

Figure 8:
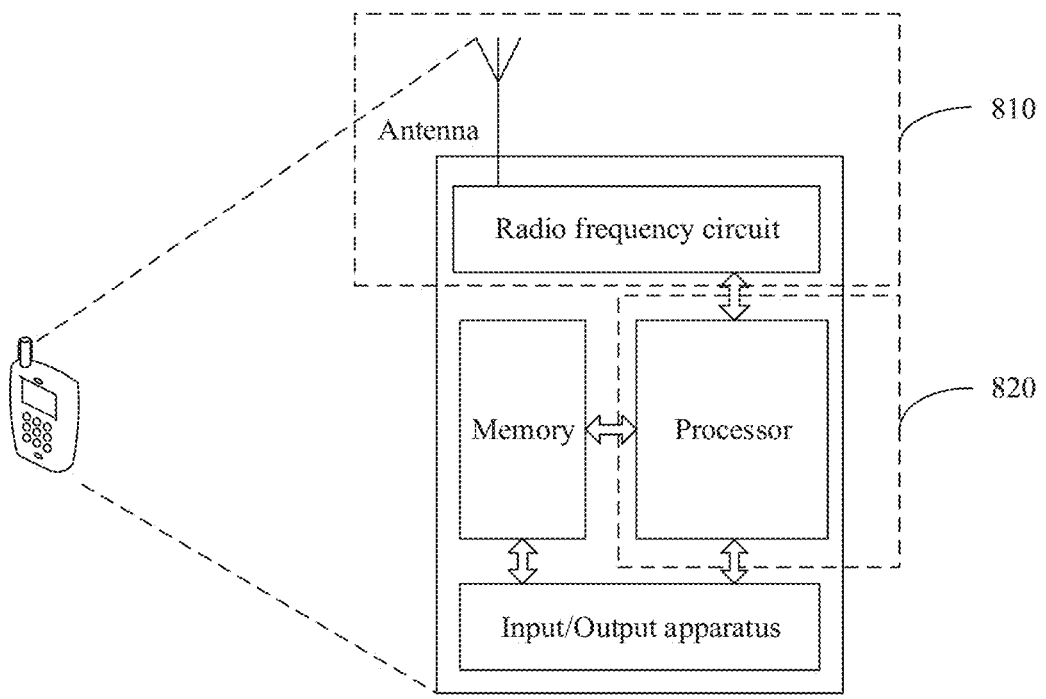
FIG. 8 is a schematic diagram of a structure of hardware of a communication apparatus according to this application.

When the communication apparatus is a terminal device, FIG. 8 is a simplified schematic diagram of a structure of hardware of the terminal device. For ease of understanding and illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user, and output data to the user. It should be noted that some types of terminal devices may have no input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in a form of an electromagnetic wave to the outside through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 8 shows only one memory and one processor. An actual terminal device product may include one or more processors and one or more memories. The memory may also be referred to as a storage medium, a storage device, or the like. The memory may be deployed independent of the processor or may be integrated with the processor. This is not limited in this embodiment of this application.

In this embodiment of this application, the antenna and the radio frequency circuit that have transceiver functions may be considered as a transceiver unit of the terminal device, and the processor that has a processing function may be considered as a processing unit of the terminal device. As shown in FIG. 8, the terminal device includes a transceiver unit 810 and a processing unit 820. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit may sometimes be referred to as a transceiver, a transceiver machine, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

It should be understood that the transceiver unit 810 is configured to perform a sending operation and a receiving operation on the terminal device side in the foregoing method embodiments, and the processing unit 820 is configured to perform an operation other than the receiving and sending operations of the terminal device in the foregoing method embodiments.

Figure 9:
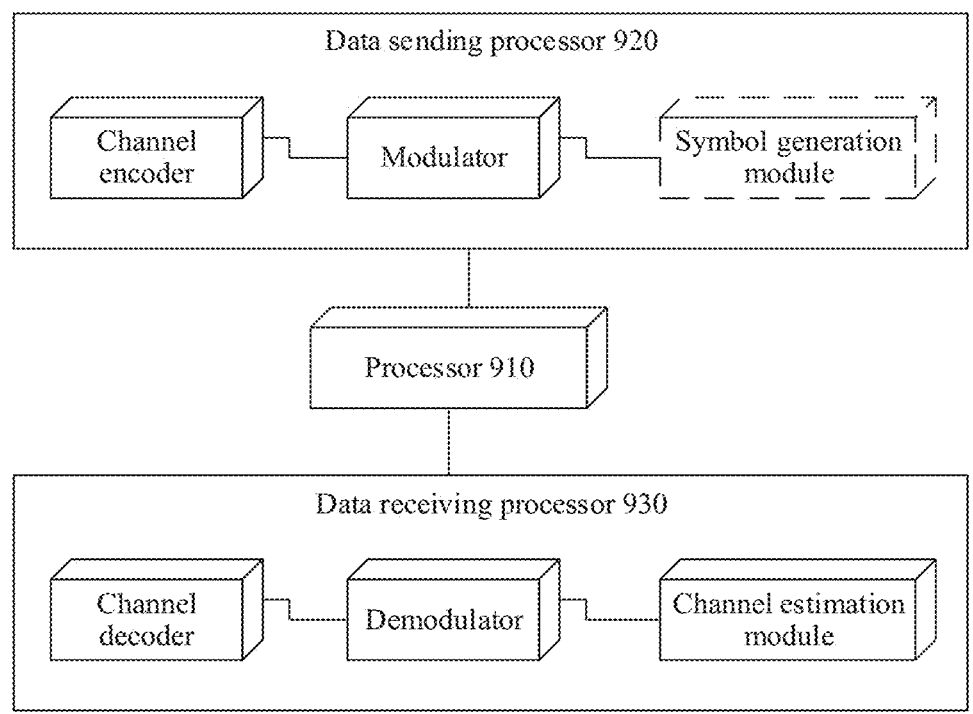
FIG. 9 is a schematic diagram of a structure of hardware of a communication apparatus according to this application.

When the communication apparatus in this embodiment is a terminal device, reference may be made to a device shown in FIG. 9. In an example, the device may implement functions similar to those of the terminal device in FIG. 8. In FIG. 9, the device includes a processor 910, a data sending processor 920, and a data receiving processor 930. The processing unit 820 in the foregoing embodiment may be the processor 910 in FIG. 9, and completes a corresponding function. The transceiver unit 810 in the foregoing embodiment may be the data sending processor 920 and/or the data receiving processor 930 in FIG. 9. Although FIG. 9 shows a channel encoder and a channel decoder, it may be understood that these modules are merely examples, and do not constitute any limitation on this embodiment.

Figure 10:
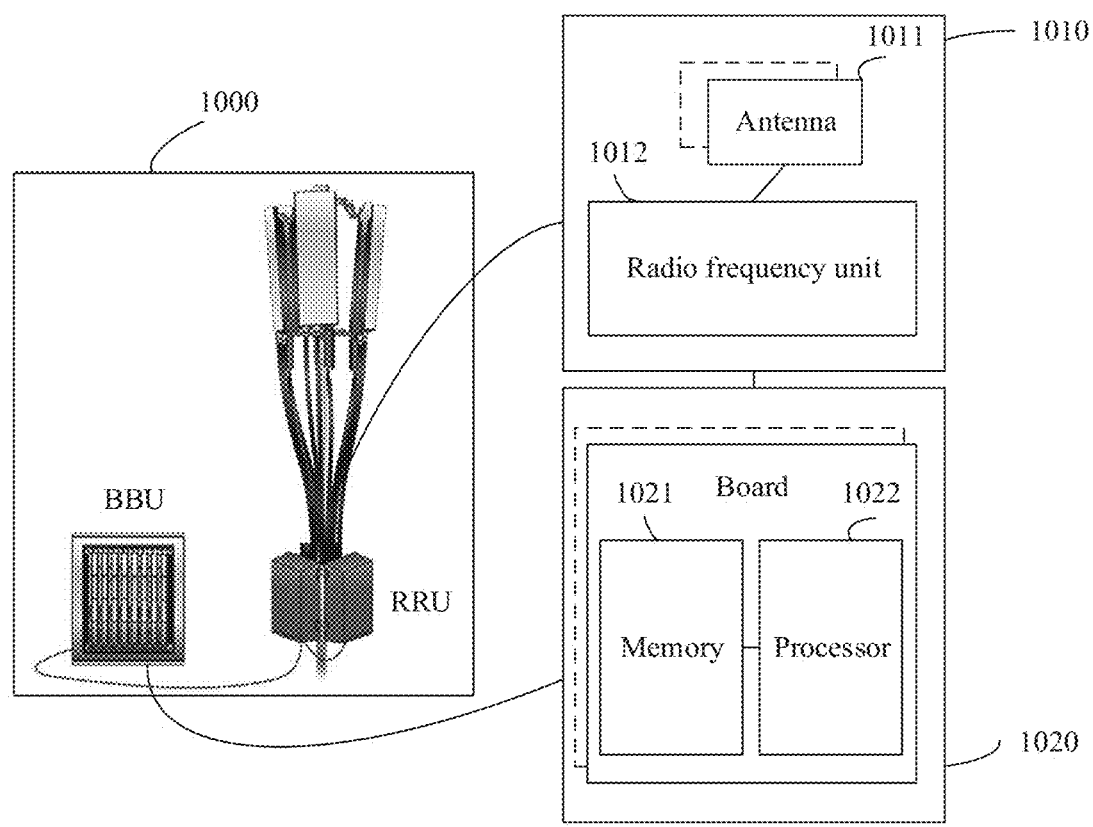
FIG. 10 is a schematic diagram of a structure of hardware of a communication apparatus according to this application.

When the communication apparatus is a network device, FIG. 10 is a simplified schematic diagram of a structure of hardware of the network device. As shown in FIG. 10, the communication apparatus 1000 includes one or more radio frequency units, for example, a remote radio unit (RRU) 1010 and one or more baseband units (BBU) (which may also be referred to as a digital unit (DU)) 1020. The RRU 1010 may be referred to as a transceiver module, and corresponds to the transceiver module 502 in FIG. 7. Optionally, the transceiver module may also be referred to as a transceiver machine, a transceiver circuit, a transceiver, or the like, and may include at least one antenna 1011 and a radio frequency unit 1012. The RRU 1010 is mainly configured to send and receive a radio frequency signal, and perform conversion between the radio frequency signal and a baseband signal. For example, the RRU 1010 is configured to send indication information to a terminal device. The BBU 1020 is mainly configured to perform baseband processing, control the base station, and the like. The RRU 1010 and the BBU 1020 may be physically disposed together, or may be physically disposed separately, namely, a distributed base station.

The BBU 1020 is a control center of the base station, may also be referred to as a processing module, and is mainly configured to implement a baseband processing function such as channel coding, multiplexing, modulation, and frequency spread. For example, the BBU (the processing module) may be configured to control the base station to perform an operation procedure related to the network device in the foregoing method embodiment, for example, generate the foregoing indication information.

In an example, the BBU 1020 may include one or more boards. A plurality of boards may jointly support a radio access network (for example, an LTE network) having a single access standard, or may separately support radio access networks (for example, the LTE network, a 5G network, or another network) having different access standards. The BBU 1020 further includes a memory 1021 and a processor 1022. The memory 1021 is configured to store necessary instructions and data. The processor 1022 is configured to control the base station to perform a necessary action, for example, control the base station to perform the operation procedure related to the network device in the foregoing method embodiments. The memory 1021 and the processor 1022 may serve one or more boards. In other words, a memory and a processor may be separately deployed on each board. Alternatively, the plurality of boards may share a same memory and processor. In addition, a necessary circuit may further be deployed on each board.

According to the method provided in embodiments of this application, this application further provides a computer storage medium, configured to store a computer program. When the computer program is run on a computer, the computer is enabled to perform the method in any one of the embodiments shown in FIG. 2, FIG. 4, and FIG. 5.

According to the method provided in embodiments of this application, this application further provides a computer program product. When the computer program product runs on a computer, the computer is enabled to perform the method in any one of the embodiments shown in FIG. 2, FIG. 4, and FIG. 5.

According to the method provided in embodiments of this application, this application further provides a chip, including a processor and an interface, and configured to invoke, from a memory, a computer program stored in the memory, and run the computer program, to perform the method in any one of the embodiments shown in FIG. 2, FIG. 4, and FIG. 5.

According to the method provided in embodiments of this application, this application further provides a system. The system includes the foregoing one or more terminal devices and the foregoing one or more network devices.

It should be understood that, the processor mentioned in embodiments of this application may be a central processing unit (CPU), another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another appropriate type.

It should be further understood that the first, the second, and various numbers in this specification are merely used for differentiation for ease of description, and are not construed as a limitation on the scope of this application.

It should be noted that a term "and/or" in this specification describes only an association relationship for describing associated objects and represents that three relationships may exist. For example, A and/or B may indicate the following cases: Only A exists, both A and B exist, and only B exists. In addition, the character "/" in this specification generally represents an "or" relationship between the associated objects.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a system information block, comprising:
    receiving indication information sent by a network device, wherein the indication information indicates a transmission period of periodic transmission of a system information block 1 (SIB1), or indicates a transmission location of aperiodic transmission of the SIB1; and
    receiving, based on the indication information, the SIB1 sent by the network device, wherein receiving the indication information sent by the network device comprises:
    receiving a first synchronization signal block (SSB) sent by the network device, wherein the first SSB carries information on a physical broadcast channel (PBCH), and the PBCH is used to carry a master information block (MIB), which includes the following fields:
        a dmrs-TypeA-Position field for determining a position of a demodulation reference signal,
        a systemFrameNumber field for determining a frame number,
        a subCarrierSpacingCommon field for determining a data subcarrier spacing,
        a cellBarred field for determining whether a cell can be accessed,
        an intraFreqReselection field for performing intra-frequency cell reselection,
        an ssb-SubcarrierOffset field for determining an offset between an SSB subcarrier and a data subcarrier, and
        a pdcch-ConfigSIB1 field for determining configuration information of a PDCCH of a SIB1; and
    wherein all or some fields of the dmrs-TypeA-Position, the intraFreqReselection, cellBarred, and the subCarrierSpacingCommon indicate the transmission period of the SIB1; and
    receiving downlink control information (DCI) that is of the SIB1 and that is sent by the network device, wherein transmission frames corresponding to 10 ms are combined to several groups and data bits in the DCI indicate a transmission status of the SIB1 in the groups of transmission frames.

2. The method according to claim 1, wherein receiving the indication information sent by the network device comprises:
    receiving the DCI that is of the SIB1 and that is sent by the network device, wherein the DCI comprises the indication information.

3. The method according to claim 2, wherein the receiving DCI sent by the network device comprises:
    receiving a second SSB sent by the network device, wherein the second SSB indicates configuration information of a physical downlink control channel (PDCCH) of the SIB1; and
    receiving, on the PDCCH based on the configuration information, the DCI of the SIB1 sent by the network device.

4. The method according to claim 3, wherein the indication information in the DCI indicates a transmission period of the SIB1 associated with an index of the second SSB.

5. The method according to claim 3, wherein the second SSB and the PDCCH have a quasi co-location (QCL) relationship.

6. The method according to claim 1, wherein the receiving, based on the indication information, the SIB1 sent by the network device comprises:
    determining the transmission period of the SIB1 or the transmission location of the SIB1 based on the indication information; and receiving, on a physical downlink shared channel (PDSCH) of the SIB1 based on the transmission period or the transmission location of the SIB1, the SIB1 sent by the network device.

7. The method according to claim 1, wherein receiving the indication information sent by the network device comprises:
receiving the first SSB sent by the network device, wherein the first SSB comprises the indication information.

8. The method according to claim 1, wherein the indication information is used to reconfigure the transmission period of periodic transmission of the SIB1.

9. A method for transmitting a system information block, comprising:
generating indication information, wherein the indication information indicates a transmission period of periodic transmission of a system information block 1 (SIB1), or indicates a transmission location of aperiodic transmission of the SIB1; and
sending the indication information to a terminal device, wherein the sending the indication information to a terminal device comprises:
sending a first synchronization signal block (SSB) to the terminal device, wherein the first SSB comprises the indication information, wherein the first SSB carries information on a physical broadcast channel (PBCH), and the PBCH is used to carry a master information block (MIB), which includes the following fields:
a dmrs-TypeA-Position field for determining a position of a demodulation reference signal,
a systemFrameNumber field for determining a frame number,
a subCarrierSpacingCommon field for determining a data subcarrier spacing,
a cellBarred field for determining whether a cell can be accessed,
an intraFreqReselection field for performing intra-frequency cell reselection,
an ssb-SubcarrierOffset field for determining an offset between an SSB subcarrier and a data subcarrier, and
a pdcch-ConfigSIB1 field for determining configuration information of a PDCCH of a SIB1; and
wherein all or some fields of the dmrs-TypeA-Position, the intraFreqReselection, cellBarred, and the subCarrierSpacingCommon indicate the transmission period of the SIB1; and
sending downlink control information (DCI) of the SIB1 to the terminal device, wherein transmission frames corresponding to 10 ms are combined to several groups and data bits in the DCI indicate a transmission status of the SIB1 in the groups of transmission frames.

10. The method according to claim 9, wherein the sending the indication information to a terminal device comprises:
sending the DCI of the SIB1 to the terminal device, wherein the DCI comprises the indication information.

11. The method according to claim 10, wherein the sending DCI to the terminal device comprises:
sending a second SSB to the terminal device, wherein the second SSB indicates configuration information of a physical downlink control channel (PDCCH) of the SIB1; and
sending, on the PDCCH based on the configuration information, DCI of the SIB1 to the terminal device.

12. The method according to claim 11, wherein the indication information in the DCI indicates a transmission period of the SIB1 associated with an index of the second SSB.

13. The method according to claim 11, wherein the second SSB and the PDCCH have a quasi co-location (QCL) relationship.

14. A communication apparatus, comprising:
at least one processor; and
a transceiver configured to:
receive indication information sent by a network device, wherein the indication information indicates a transmission period of periodic transmission of a system information block 1 (SIB1), or indicates a transmission location of aperiodic transmission of the SIB1; and
receive, based on the indication information, the SIB1 sent by the network device, wherein the indication information sent by the network device is received by:
receiving a first synchronization signal block (SSB) sent by the network device, wherein the first SSB carries information on a physical broadcast channel (PBCH), and the PBCH is used to carry a master information block (MIB), which includes the following fields:
a dmrs-TypeA-Position field for determining a position of a demodulation reference signal,
a systemFrameNumber field for determining a frame number,
a subCarrierSpacingCommon field for determining a data subcarrier spacing,
a cellBarred field for determining whether a cell can be accessed,
an intraFreqReselection field for performing intra-frequency cell reselection,
an ssb-SubcarrierOffset field for determining an offset between an SSB subcarrier and a data subcarrier, and
a pdcch-ConfigSIB1 field for determining configuration information of a PDCCH of a SIB1; and
wherein all or some fields of the dmrs-TypeA-Position, the intraFreqReselection, cellBarred, and the subCarrierSpacingCommon indicate the transmission period of the SIB1; and
receiving downlink control information (DCI) that is of the SIB1 and that is sent by the network device, wherein transmission frames corresponding to 10 ms are combined to several groups and data bits in the DCI indicate a transmission status of the SIB1 in the groups of transmission frames.

15. The communication apparatus according to claim 14, wherein the transceiver is configured to:
receive downlink control information (DCI) that is of the SIB1 and that is sent by the network device, wherein the DCI comprises the indication information.

16. The communication apparatus according to claim 15, wherein the transceiver is configured to:
receive a second SSB sent by the network device, wherein the second SSB indicates configuration information of a physical downlink control channel (PDCCH) of the SIB1; and
receive, on the PDCCH based on the configuration information, the DCI of the SIB1 sent by the network device.

17. The communication apparatus according to claim 16, wherein the indication information in the DCI indicates a transmission period of the SIB1 associated with an index of the second SSB.

18. The communication apparatus according to claim 16, wherein the second SSB and the PDCCH have a quasi co-location (QCL) relationship.

19. The communication apparatus according to claim 14, wherein:
- the at least one processor is configured to determine the transmission period of the SIB1 or the transmission location of the SIB1 based on the indication information; and
- the transceiver is configured to receive, on a physical downlink shared channel (PDSCH) of the SIB1 based on the transmission period or the transmission location of the SIB1, the SIB1 sent by the network device.

20. The communication apparatus according to claim 14, wherein the transceiver is configured to:
- receive the first SSB sent by the network device, wherein the first SSB comprises the indication information.

\* \* \* \* \*